US006923312B2

(12) United States Patent
Pham et al.

(10) Patent No.: US 6,923,312 B2
(45) Date of Patent: Aug. 2, 2005

(54) DUAL-WEB TRANSPORT BELT CLEANING APPARATUS AND METHOD

(75) Inventors: Le Pham, Vancouver, WA (US); Wesley Baxter Roche, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 54 days.

(21) Appl. No.: 10/649,535

(22) Filed: Aug. 27, 2003

(65) Prior Publication Data

US 2004/0046852 A1 Mar. 11, 2004

Related U.S. Application Data

(62) Division of application No. 09/584,016, filed on May 30, 2000, now Pat. No. 6,679,601.

(51) Int. Cl.$^{7}$ ................................................ B65G 45/22

(52) U.S. Cl. ........................ 198/495; 198/498; 101/424

(58) Field of Search ................................ 198/495, 498; 101/423, 424, 425

(56) References Cited

U.S. PATENT DOCUMENTS 5,367,955 A * 11/1994 Hara et al. .................. 101/424
5,506,669 A * 4/1996 Inoue et al. .................. 399/71
5,526,028 A * 6/1996 Rottman ...................... 347/23
6,347,587 B2 * 2/2002 Ghisalberti et al. ......... 101/424
6,449,448 B2 * 9/2002 Bessho et al. .............. 399/149
6,530,658 B1 * 3/2003 Pham ......................... 347/104
6,588,337 B1 * 7/2003 Kreckel et al. ............. 101/424
6,694,879 B2 * 2/2004 Schuster et al. ............ 101/425

* cited by examiner

*Primary Examiner*—Joseph E. Valenza

(57) ABSTRACT

A method and apparatus for cleaning a perforated, transport belt has belt surface cleaner mechanisms that include a pair of moveable, consumable webs. A scrubbing of the belt by a wet web is followed by a scrubbing of the belt by a dry, absorbent web. A solvent dispensing mechanism can be fluidically coupled to re-soak the wet web. Mechanisms for selectively engaging and disengaging the belt surface cleaner mechanisms ensure free belt travel during flexible material transport and the cleaning of both surfaces during cleaning cycles. The system includes consumable piece-part elements for refurbishing and remanufacturing.

49 Claims, 6 Drawing Sheets

DUAL-WEB TRANSPORT BELT CLEANING APPARATUS AND METHOD

CROSS REFERENCE TO RELATED APPLICATION(S)

This is a divisional of application Ser. No. 09/584,016 filed on May 30, 2000, now U.S. Pat. No. 6,679,601, which is hereby incorporated by reference herein.

BACKGROUND OF THE INVENTION

1. Field of the Invention

The present invention relates generally to transport belts (sometimes referred to in the art as conveyor belts), particularly to a method and apparatus for cleaning a transport belt and, more specifically, to cleaning a print media transport belt in an ink-jet hard copy apparatus.

2. Description of Related Art

The art of ink-jet technology is relatively well developed. Commercial products such as computer printers, graphics plotters, copiers, and facsimile machines employ ink-jet technology for producing hard copy. The basics of this technology are disclosed, for example, in various articles in the *Hewlett-Packard Journal*, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994) editions. Ink-jet devices are also described by W. J. Lloyd and H. T. Taub in *Output Hardcopy* [*sic*] *Devices*, chapter 13 (Ed. R. C. Durbeck and S. Sherr, Academic Press, San Diego, 1988).

FIG. 1 (PRIOR ART) depicts a hard copy apparatus, in this exemplary embodiment a computer peripheral, ink-jet printer, 101. A housing 103 encloses the electrical and mechanical operating mechanisms of the printer 101. Operation is administrated by an electronic controller 102 (usually a microprocessor or application specific integrated circuit ("ASIC") controlled printed circuit board) connected by appropriate cabling to a computer (not shown). It is well known to program and execute imaging, printing, print media handling, control functions and logic with firmware or software instructions for conventional or general purpose microprocessors or with ASIC's. Cut-sheet print media 105, loaded by the end-user onto an input tray 120, is fed by a suitable paper-path transport mechanism (not shown) to an internal printing station where graphical images or alphanumeric text is created. A carriage 109, mounted on a slider 111, scans the print medium. An encoder subsystem 113 is provided for keeping track of the position of the carriage 109 at any given time. A set of individual ink-jet pens, or print cartridges, 115"X" is mounted in the carriage 109 (generally, in a full color system, inks for the subtractive primary colors, cyan, yellow, magenta (X=C, Y, or M) and true black (X=K) are provided; in some implementations an ink-fixer chemical (X=F) is also used). An associated set of replaceable or refillable ink reservoirs 117"X" is coupled to the pen set by ink conduits 119. Ink is deposited on the sheet of media 105 at a "print zone," or "printing station," 107. Once a printed page is completed, the print medium is ejected onto an output tray 121. The carriage scanning axis is conventionally designated the x-axis, the print media transit axis is designated the y-axis, and the printhead firing direction is designated the z-axis.

For convenience of describing the ink-jet technology and the present invention, all types of print media are referred to simply as "paper," all compositions of colorants are referred to simply as "ink," and all types of hard copy apparatus are referred to simply as a "printer." No limitation on the scope of invention is intended nor should any be implied.

FIG. 2 is a schematic depiction of another ink-jet hard copy apparatus 210 as may be associated with the present invention. A writing instrument 115X is provided with a printhead 214 having drop generators including nozzles for ejecting ink droplets onto an adjacently positioned print medium, e.g., a sheet of paper 105, in the apparatus' printing zone 107. A perforated, endless-loop belt 232 is one type of known manner printing zone input-output paper transport. A motor 233 having a drive shaft 230 is used to drive a gear train 235 coupled to a belt pulley, or roller, 238 mounted on a fixed axle 239. A biased idler wheel 240 provides appropriate tensioning of the belt 232. The belt rides over a platen 236 (sometimes including heating devices) in the print zone 107 associated with a known manner vacuum induction system 237. The paper sheet 105 is picked from an input supply (not shown) and its leading edge 254 is delivered to a guide 250, 252 where a pinch wheel 242 in contact with the belt 232 takes over and acts to transport the paper sheet 105 through the printing zone 107 (the paper path is represented by arrow 231). Downstream of the printing zone 107, an output roller 244 in contact with the belt 232 receives the leading edge 254 of the sheet 105 and continues the paper transport until the trailing edge 255 of the now printed page is released.

Ink-jet technology is used to describe the present invention even though it has wider applicability because the ink-jet environment typifies a transport belt use where the local environment may contain contaminants such as ink mist and paper dust which can soil a transport belt and clog perforations in a vacuum belt or even be sucked through the belt, contaminating the subjacent platen and other subsystems of the apparatus. Furthermore, the latest generation of ink-jet printers has found commercial success for economical color printing of high resolution graphics, including photographic reproductions, which require edge-to-edge paper printing (referred to as "full bleed"). Overspray and aerosol will build up on the belt over time. Not only does this affect performance of the belt itself, ink on the belt can be transferred undesirably to the back side of the print, particularly if the ink remains in a liquid or semi-fluidic state.

It can also be recognized that this type of problem can occur in other vacuum transport systems such as for transporting thin sheets of metal where particulate flakes might be present or for coating processes where an aerosol spray is used on a passing receptor on the transport belt.

Thus, there is a need for a method and apparatus for cleaning transport belts.

SUMMARY OF THE INVENTION

A method and apparatus for cleaning a perforated, transport belt has belt surface cleaner mechanisms that include a pair of moveable, consumable webs. A scrubbing of the belt by a wet web is followed by a scrubbing of the belt by a dry, absorbent web. A solvent dispensing mechanism can be fluidically coupled to re-soak the wet web. Mechanisms for selectively engaging and disengaging the belt surface cleaner mechanisms ensure free belt travel during flexible material transport and the cleaning of both surfaces during cleaning cycles. The system includes consumable piece-part elements for refurbishing and remanufacturing.

In a basic aspect, the present invention provides a method for cleaning a transport belt, including the steps of: positioning a solvent-bearing cleaning web in non-contacting juxtaposition to a transport surface of the belt; positioning a dry cleaning web downstream of the cleaning web in non-contacting juxtaposition to the transport surface of the belt; and selectively repositioning both the solvent-bearing cleaning web and the dry cleaning web into contact with the surface.

In another basic aspect, the present invention provides a transport belt cleaning apparatus including: first web means for wet cleaning mounted adjacently an outer surface of the belt; mounted downstream of the first web means, second web means for dry cleaning the outer surface; means for selectively engaging the first and second web means with the outer surface.

In another basic aspect, the present invention provides an ink-jet hard copy apparatus including: a transport belt for media input-output; a belt inner-surface cleaner; and a belt outer-surface cleaner, including a first movable wet web and a second movable dry web mounted downstream of the wet web, wherein the inner-surface cleaner and outer-surface cleaner are releasably engagable with the belt.

In another basic aspect, the present invention provides a method for re-furbishing an ink-jet printer having a vacuum belt cleaning apparatus including the steps of: removing the cleaning apparatus; and replacing the cleaning apparatus.

In another basic aspect, the present invention provides a consumable ink-jet vacuum belt cleaning apparatus including: mounts for positioning cleaners in contraposition to each side of the belt; and cleaners affixed to the mounts.

In another basic aspect, the present invention provides an ink-jet hard copy apparatus endless-loop, vacuum-actuated, media transport belt cleaning system including: a renewable first belt cleaning subsystem mounted adjacent an inner surface of the belt, including at least one belt wiper; and a renewable second belt cleaning subsystem mounted adjacent an outer surface of the belt, including a first web, bearing a belt cleaning solvent and, downstream of the one web, a second web fabricated of material for absorbing the cleaning solvent, wherein the first belt cleaning subsystem and second belt cleaning subsystem are contraposed with the belt therebetween and are selectively engagable and disengagable with the respective inner surface and outer surface.

Some advantages of the present invention are:

it provides a self-contained subsystem which may be repaired, replenished, or replaced independently the transport belt subsystem;

it provides commercial implementation using consumable parts which can be obtained and installed by the end user; and it provides a simple re-manufacture capability to the apparatus in which it is implemented.

The foregoing summary and list of advantages is not intended by the inventors to be an inclusive list of all the aspects, objects, advantages and features of the present invention nor should any limitation on the scope of the invention be implied therefrom.

This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Other objects, features and advantages of the present invention will become apparent upon consideration of the following explanation and the accompanying drawings, in which like reference designations represent like features. throughout the drawings.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable.

Figure 1:
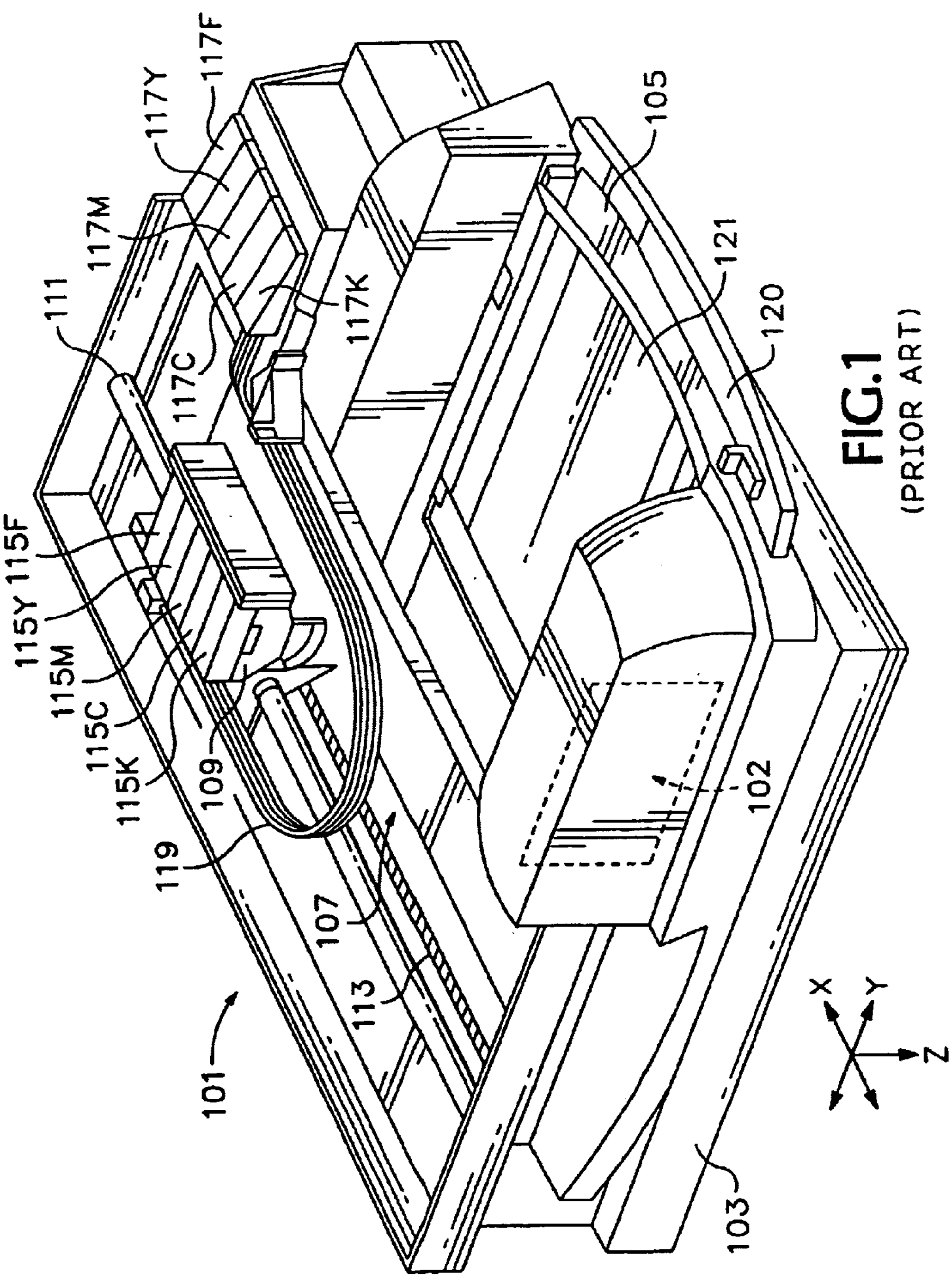
FIG.1 (PRIOR ART)
FIG. 1 (PRIOR ART) is a perspective view drawing typifying an ink-jet hard copy apparatus.
Figure 2:
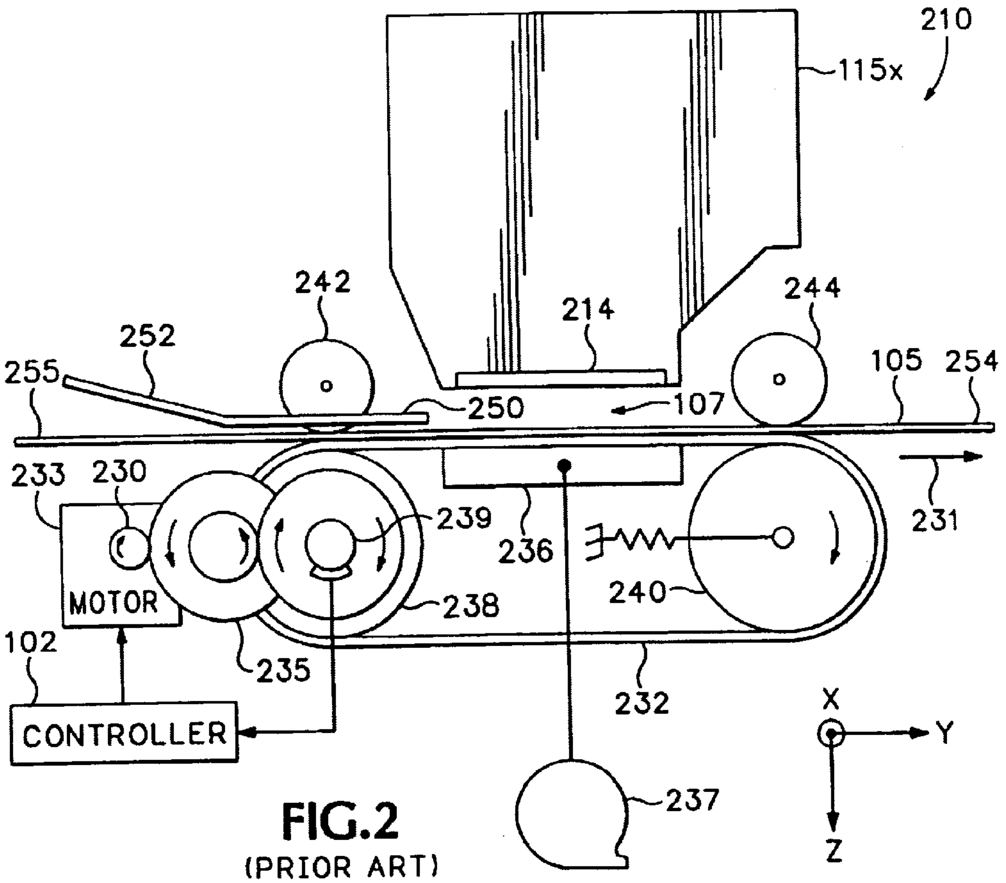
FIG.2 (PRIOR ART)
FIG. 2 (PRIOR ART) is a schematic elevation view illustration of a paper transport vacuum belt type ink-jet hard copy apparatus.
Figure 3:
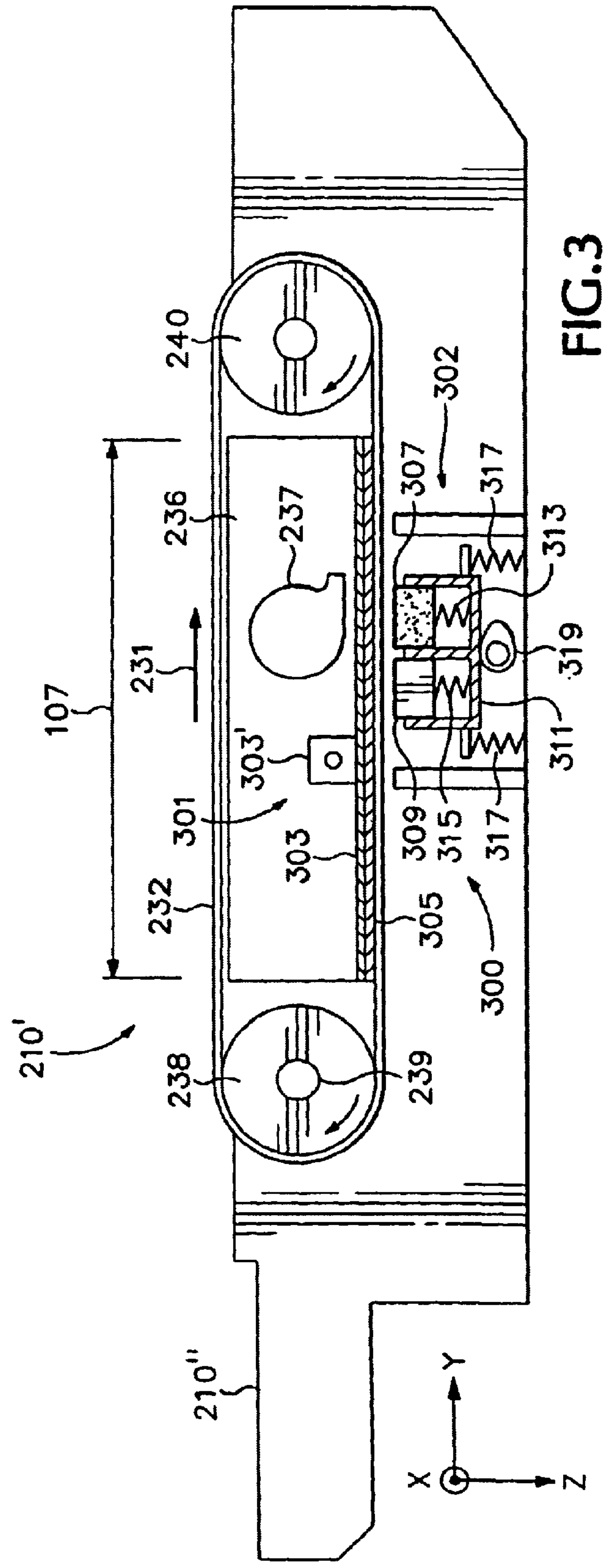
FIG. 3 is a schematic elevation view illustration of a paper transport vacuum belt type ink-jet hard copy apparatus showing a first embodiment of belt cleaning devices in accordance with the present invention.

Turning to FIG. 3, a belt cleaning subsystem 300 in accordance with the present invention is shown in an exemplary embodiment implementation as part of an ink-jet hard copy apparatus 210' schematically represent by a framework 210".

The present invention comprises two subsystems: a belt 232 inner-surface cleaner 301 and a belt outer-surface cleaner 302, wherein the "outer-surface" is a vacuum-holding transport surface of the belt. The cleaner 301, 302 subsystems are preferably independently serviceable. In the exemplary embodiment shown, the cleaner 301, 302 subsystems are subjacent a vacuum-box-platen 236.

The inner-surface cleaner 301 includes an inner-surface wiper mount 303, such as a stiff, flat plate—e.g., a metal, sheet metal, or plastic plate—with a mounting flange 303'. The wiper mount 303 should be at least as wide as the belt 232 cross-sectional dimension and have a length to optimize wiping area and wiper absorbent capacity as the belt passes between the drive rollers 239, 240. A belt inner-surface wiper 305 is affixed to the mount 303 such that a wiping surface is adjacent the inner-surface of the belt 232. In order to prevent excessive wear it is preferable that the wiping surface to belt inner-surface have a clearance, e.g., approximately one millimeter ("mm"), when not being used to clean the inner-surface. It is preferred that this wiper 305 be fabricated of a dry, absorbent, lint-free material. For example, a three-to-five millimeter thick, felt pad, or a relatively high density, absorbent, sponge material may be employed. Launderable, reusable, pad materials can be employed. Disposable pad materials can be employed. In general, the contact surface of wiper, or pad, 305 material should be relatively smooth and somewhat compliant in order to clean the belt surface effectively. If made of a fiber-based material, the contact surface of the wiper 305 could be singed or otherwise treated as would be known in the art to prevent fibers from tracking onto the belt 232. All wiper materials should be soft enough not to damage belt surfaces.

The inner-surface wiper 305 can be glued to the mount 303 such that the entire subsystem is disposable and replaceable. Alternatively, the inner-surface wiper 305 can be releasably secured to the mount 303 in a known manner so that the belt inner-surface wiper 305 is removable and replaceable with a clean wiper replacement pad for a reusable mount 303. The inner-surface wiper 305 should be equal to or slightly greater than the belt 232 width dimension.

The outer-surface belt cleaner 302 subsystem could be a mirror embodiment of the inner-surface belt cleaner 301, subjacent the belt 232 opposing the inner-surface belt cleaner 301 subsystem. Each subsystem 301, 302 can employ a known manner elevating subsystem to engage respective wipers with the belt 232 inner and outer surfaces. However, as the outer surface of the belt 232 will have a far greater degree of deposits, it has been found to be preferable to use both wet and dry wiping of at least the outer surface.

As shown in the embodiment of FIG. 3 therefore, a wet pressure pad 307 and a dry pressure pad 309 are provided in series for sequentially wiping the belt 232 outer surface. In the belt travel direction, arrow 231, the wet pressure pad 307 is upstream and the dry pressure pad 309 downstream. A pad holder 311 is mounted in the apparatus 210' subjacent the belt 232 and opposing at least some part of the inner-surface belt cleaner 301 subsystem. The pad holder 311 is provided with positive pressure biasing members 313, 315 for each pad 307, 309. The pad holder 311 is mounted on at least one return biasing member 317. In the shown embodiment, a clearance, for example in the range of approximately one to three millimeters, is provided between the reach of each pads' 307, 309 cleaning surface and the outer surface of the belt 232 when the subsystem 302 is disengaged. The belt 232 during a paper transport and printing operational cycle through the print zone 107 is thus free to travel between the inner-surface cleaner 301 and the outer-surface cleaner 302. To clean the belt 232, the elevating subsystem 319 (in this embodiment a cam having a mechanical linkage (not shown) for end-user manipulation) lifts the holder 311 until the gap between the wet pressure pad 307 and dry pressure pad 309 in the holder 311 and the belt surface is closed. Then, the holder 311 elevating subsystem 319 continues upward until the gap between the inner-surface belt cleaner 301 is also closed. Thus, both surfaces of the belt 232 are being wiped by the belt wiping pads 305, 307, 309 when the elevating subsystem 319 is engaged. It should be recognized that separate elevating subsystems can be provided for each cleaner subsystem 301, 302. The wet pressure pad 307 is pre-soaked with a solvent appropriate to the type of ink employed (or other aerosol chemical being used in a non-ink-jet environment). The dry pressure pad 317 should be absorbent of the solvent and ink residue and solvent mixtures.

Either the entire belt outer-surface cleaner 302 subsystem can be replaceable as a unit or each pad can be separately replaceable in the same manner as with the inner-surface wiper 305. The wet and dry cleaning pads may be replaceable at every cleaning cycle or be designed to be more durable as needed.

In operation, such when ink smearing is noticed on the back side of a finished print or during routine maintenance by the end-user, fresh wipers are installed if needed, and the cam 319 is turned (counter-clockwise in this illustration) to raise the holder 311 and contained pressure pads 307, 309 up against the outer surface of the belt 232 (direction indicated by arrows on the belt drive rollers 239, 240) until the biasing members 313, 315 exert enough force to push the belt 232 upward until its inner surface is pressed against the inner surface wiper 305. The pressure will squeeze some solvent out of the wet pad 307. Note that since the belt 232 is perforated for transmission of a vacuum in this embodiment, some solvent will be passed through the perforations to the inner surface of the belt and, consequently, onto the inner surface wiper 305. The inner wiper 305 can be of a material having a higher surface energy than that of the transport surface wipers 307, 309 in order to help solvent to be drawn through the belt perforations. Thus, both sides of the belt 232 are "washed." Downstream, the inner surface wiper 305 and the dry pressure pad 309 will absorb the mixture of solvent and particulate residue washed from the belt 232.

After a predetermined, recommended time of contact, the cam 319 is reversed and the belt 232 released from the cleaner 301, 302 subsystems. While a predetermined pressure of the wipers against the belt surfaces can be tailored, it should also be recognized that solvent can be transferred to the belt via capillary forces created by the interface between the belt and wipers when the belt is moving.

In order to eliminate reverse bending of the belt and reduce belt fatigue, the inner surface cleaning subsystem can also be movable into engagement with the belt only during a cleaning operation.

Figure 3A:
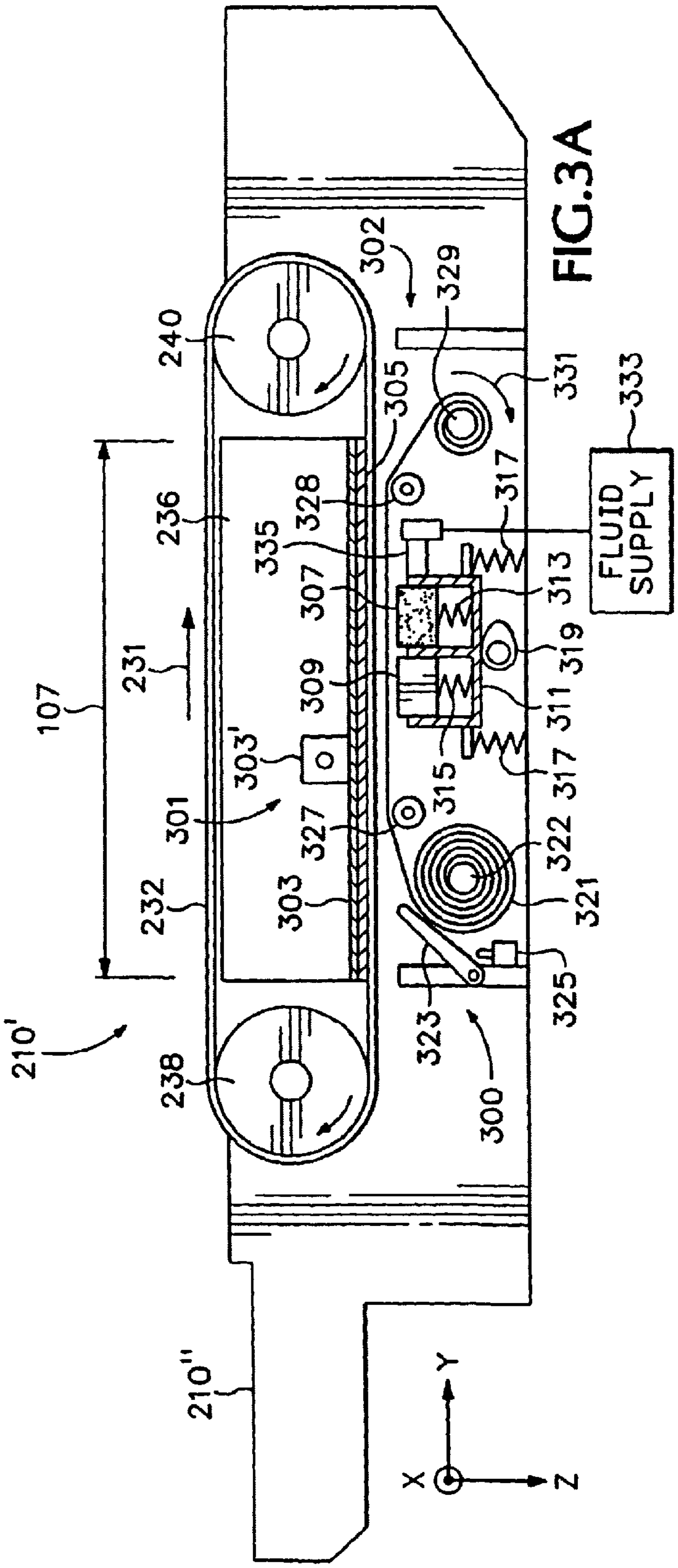
FIG. 3A is a schematic elevation view illustration of a paper transport vacuum belt type ink-jet hard copy apparatus showing a second embodiment of belt cleaning devices in accordance with the present invention.

Turning now to FIG. 3A, an alternative embodiment is depicted in which the outer-surface cleaner 302 includes a rolled web 321 mounted on a rotating shaft 322. The web 321 is a rolled supply of belt wiping material, preferably an absorbent fabric such as a fiber-based polyester, rayon, absorbent cotton cloth, or the like textile. A web material having a thickness in the range of approximately 45 um to 140 um has been employed. The web 321 is mounted on the shaft 322 for free rotation with the shaft. A known manner tensioner 323 and out-of-web sensor 325 are associated with the web 321. The web 321 material is stretched from the roll across two support shafts, or adjunct rollers, 327, 328 to span the pressure pads 307, 309 subjacent the belt 232 outer surface. The web 321 is then captured by a driven, web take-up spool 329. The direction of rotation of the take-up spool, and thus the web material, is indicated by arrow 331. The spool 329 can be driven by a stepper motor to advance the web 321 in predetermined increments so that a fresh segment of web material is properly positioned subjacent the belt 232 for each cleaning cycle. A clearance of approximately 1 mm to 3 mm between the cleaner web 321 and belt 232 transport surface is provided when the web is disengaged from the belt transport surface.

A solvent suitably selected as appropriate for a particular ink formulation (or other particulate matter sought to be "washed" from the belt) is provided in a solvent dispensing subsystem 333 (schematically represented for any known manner local or remote, replaceable, refillable or otherwise serviceable solvent dispensing subsystem) with fittings 335 for fluidically coupling solvent to the wet pressure pad 307. Known manner techniques for dispensing and monitoring of solvent to the wet pressure pad 307—such as with appropriate valves and pumps—can be employed.

In operation during a belt cleaning cycle, the cam 319 is used to lift the holder 311 until the web material is in contact with the belt 232 outer surface and the inner-surface wiper 305 is in contact with the belt inner surface. Solvent is pumped into the wet pressure pad 307, generally at a fixed delivery rate or to a predetermined appropriate volume. The solvent will be transferred to the web 321 material superjacent the wet pressure pad 307 and thus to the belt 232 outer surface.

During a cleaning cycle, the web 321 can be wound onto the spool 329 in a direction 331 opposite of the belt 232 motion 231 to cause a stronger scrubbing force against the belt outer surface. As wound onto the spool 329 during a cleaning cycle, the web 321 will carry away dissolved ink on the belt 232 outer surface from the contact-cleaning zone. Some solvent will go through the belt perforations and onto the inner surface thereof, cleaning some ink from the perforations in addition to the inner surface itself. Any solvent solution left on the belt 232 downstream of the wet pressure pad 307 will be wiped off, absorbed by the web being pressed against the belt outer surface by the dry pressure pad 309. Alternatively, the web 321 can be stationary during the cleaning cycle for winding onto the spool 329 after the holder 311 is lowered to disengage the inner-surface wiper 305 and web 321 from respective belt 232 surfaces. This has been found to increase the useful effective life of the web 321 material; however it should be noted that during the cleaning cycle itself the web material then does not carry dissolved ink away from the cleaning zone.

The outer-surface cleaner 302 can be a completely replaceable, unitary, module or an in situ refurbishable subsystem wherein components such as the web 321, wipers 307, 309, and solvent dispensing subsystem 333 are individually replaceable or otherwise serviceable. Used pads 305, 307, 309 and web material can be manufactured to be disposable, end-user replaceable, or remanufacture-type consumables.

In operation during an paper transport cycle through the print zone 107, the belt 232 is preferably free to travel between the belt lower span's superjacent inner-surface cleaner 301 and a subjacent web 321 span region. To clean the belt 232, the elevating subsystem 319 lifts the holder 311 until the gap between the web 321 region spanning the wet pressure pad 307 and dry pressure pad 309 and the belt 232 transport surface is closed. Then, the holder 311 elevating subsystem 319 continues upward until the gap between the inner-surface belt cleaner 301 and belt inner surface is also closed. Thus, both surfaces of the belt 232 are being wiped when the elevating subsystem 319 is engaged. Alternatively, the inner-surface belt cleaner 301 can also be separately selectively positionable such that reverse bending of the belt 232 and belt fatigue can be avoided. Note also that the wet and dry pads 307, 309 and therefore separate regions of the web 231 can be made selectively engagable with the belt transport surface separately.

As noted, either the entire belt outer-surface cleaner 302 subsystem can be replaceable as a unit or each pad and the web can be separately replaceable in the same manner as with the inner-surface wiper 305. It is also contemplated that depending upon the frequency of cleaning, the web 321 may be removed from the take-up spool 329 and re-loaded onto the shaft 322 and reused until such time as it is no longer effective in cleaning the belt 232 outer surface. In a more costly system, an automated rewind mechanism can be provided. The wet and dry cleaning pads 305, 307, 309 may be replaceable at the same time as the web 321 or be designed to be more durable as needed.

To summarize the end-user operation, when ink smearing is noticed on the back side of a finished print, or at the time of standard printer maintenance, predetermined throughput intervals, or even continuously for heavy duty printing such as full-bleed type printing cycles, the cam 319 is turned (counter-clockwise in this illustration) to raise the holder 311 and contained pressure pads 307, 309 up against the web 321 spanning the pads which then is pushed into contact with the moving belt 232 (see direction arrow 231) until the biasing members 313, 315 exert enough force to push the belt 232 upward until its inner surface is against the inner-surface wiper 305. Generally, solvent will transfer from the pad to the web by contact. A predetermined pressure between the two can be provided to cause some solvent to be squeezed out of the wet pad 307 and through the web 321 material. Since the belt 232 is perforated, some solvent will be passed through the perforations to the inner surface of the belt and, consequently, the inner-surface wiper 305. Thus, both sides of the belt 232 are "washed." Downstream, the inner-surface wiper 305 and the web 321 which are in contact with the dry pressure pad 309 will absorb the mixture of solvent and particulate residue washed from the belt 232. After a predetermined or recommended time of contact, the cam 319 is reversed and the belt 232 released from the cleaner 301, 302 subsystems.

Figure 4:
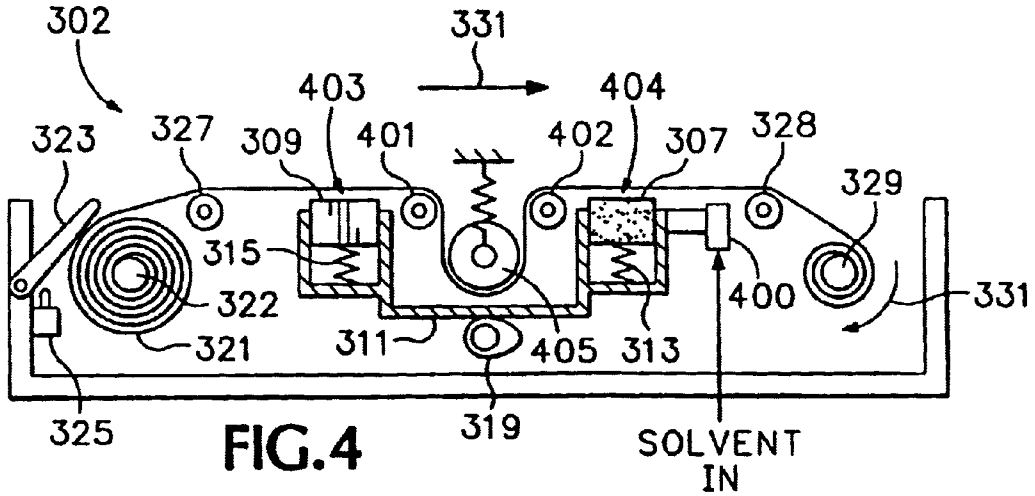
FIG. 4 is a schematic elevation view illustration of a third embodiment of belt cleaning devices in accordance with the present invention.

FIG. 4 shows an alternative embodiment of the belt outer-surface cleaner 302 subsystem. The solvent, represented by the arrow labeled "SOLVENT IN," is in a containment and delivery subsystem (not shown) located remotely from the outer-surface cleaner 302 subsystem, coupled to the wet pressure pad 307 by a fitting 400. The solvent containment can be refillable or replaceable or otherwise serviceable. To improve the "washing" and "drying" action of the outer-surface cleaner 302 subsystem, the dry pressure pad 309 and wet pressure pad 307 are spaced further apart. A pair of additional web support shafts, or rollers, 401, 402 are mounted in-board of each pad 307, 309 to create separate span regions 403, 404 of the web superjacent to each pad individually. A biased, central web roller 405 can be mounted in the holder 311 between the pads 307, 309 and lower than the pads, forming therebetween an inter-pad loop region of web 321 to move the dry pressure pad 309 a greater effective distance away from the wet pressure pad 307 and preventing cross-contamination. Generally, depending on the solvent solution and the physical properties of the absorbent web material, solvent solution may wick and spread on the web in different a real dimensions. Therefore, any specific implementation should be tailored to prevent cross-contamination between wet and dry regions. The distance between a dry and wet pad may be varied. With careful design, the roller 405 might be eliminated, reducing manufacturing complexity and cost.

It should also be recognized that in the embodiments depicted, the dry pad 309 is used to increase the cleaning effectiveness, but when the solvent solution is benign (such as just or mostly water) or highly evaporative such that no residue is left on the belt when the next media sheet is obtained at the input, the dry pad subsystem also can be eliminated.

Figure 4A:
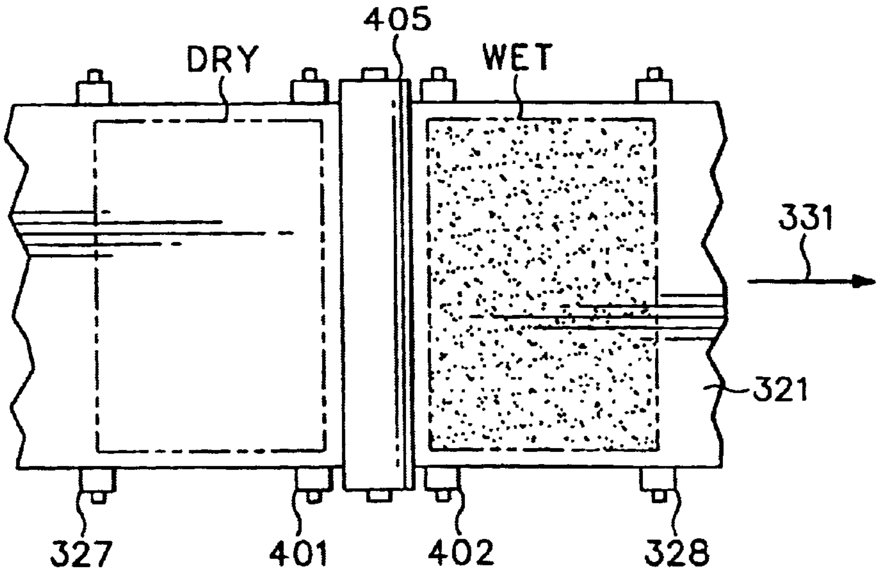
FIG. 4A is an overhead view illustration of details of the embodiment as shown in FIG. 4.

Note also that the solvent fitting 400 might instead be coupled to the central web roller 405 in a manner to dispense the solvent directly onto the web 321 itself rather than via wet pressure pad 307, creating a larger effective wet area of web material as illustrated schematically by orthogonal projection FIG. 4A.

Figure 5:
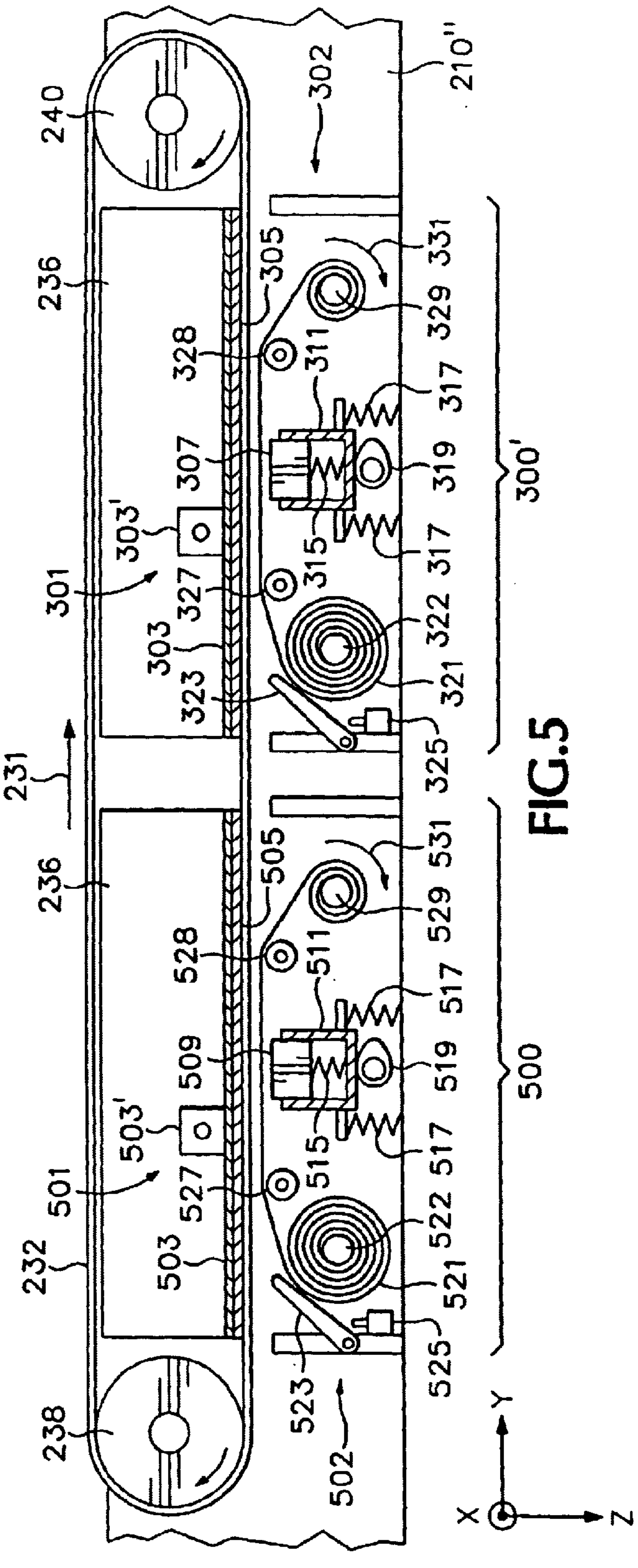
FIG. 5 is a schematic elevation view illustration of a fourth embodiment of belt cleaning devices in accordance with the present invention.

FIG. 5 shows an alternative embodiment in accordance with the present invention. This embodiment includes an upstream, belt cleaner 300' substantially identical to that shown in FIG. 3A, with modifications as noted hereinafter.

For the purpose of describing the embodiment of FIG. 5, this subsystem will be referred to as the "wet cleaner" 300'. The web 321 as shown is a material pre-soaked with the cleaning solvent. It should be recognized that solvent dispensing subsystems 333, 335 as shown in FIG. 3A can be alternatively employed with a dry web material to create a wet web. The dry pad 309 mechanism of the FIGS. 3, 3A and 4 embodiments is not used in the wet cleaner 300' subsystem.

Instead, downstream of the wet cleaner 300' is a "drying cleaner" 500. The drying cleaner 500 is substantially identical to the wet cleaner 300' only the drying cleaner web 521 material is dry, an absorbent material selected to scrub the belt 232 outer surface and absorb solvent following its application and scrubbing by the wet cleaner 300'.

The drying cleaner 500 subsystem uses two subsystems: a belt 232 inner-surface drying cleaner 501 and a belt outer-surface drying cleaner 502. The cleaner 501, 502 subsystems can be independently serviceable.

The inner-surface drying cleaner 501 subsystem includes a inner-surface wiper mount 503, such as a stiff, flat plate—e.g., a sheet metal plate—with a mounting flange 503'. The wiper mount 503 should be at least as wide as the belt 232 cross-sectional dimension and have a length to optimize absorbent capacity when engaged as the belt passes between the drive rollers 238, 240. A belt inner-surface wiper 505 is affixed to the mount 503 such that a wiping surface is adjacent the inner-surface of the belt 232 with a slight clearance. Like wiper 303 of FIGS. 3 and 3A, it is preferred that this wiper 505 be fabricated of a dry, lint-free material. Again, launderable, reusable pad materials can also be employed. The inner-surface wiper 505 can be glued to the mount 503 such that the entire subsystem is disposable and replaceable. Alternatively, the inner-surface wiper 505 can be releasably secured to the mount 503 in a known manner so that the belt inner-surface wiper 505 is removable and replaceable with a clean wiper replacement pad for the now reusable mount 503. The inner-surface wiper 505 cross-section (into the page) should be equal to or slightly greater than the belt 232 width dimension.

A dry pressure pad 509 is provided in series downstream from pressure pad 307 for engaging a dry web 521 material region with the belt 232 outer surface. A pad holder 511 is mounted within the apparatus frame 210" subjacent the belt 232 and opposing the inner-surface belt drying cleaner 501 subsystem. The pad holder 511 is provided with positive pressure biasing member 515 for the pad 509. The pad holder 511 is mounted on at least one return biasing member 517. A clearance is provided between the pad 509 upper reach and the outer surface of the belt 232 during printing cycles of the hard copy apparatus.

The outer-surface drying cleaner 502 subsystem is provided with a rolled web 521 mounted on a rotating shaft 522. The drying material web 521 is a rolled supply of belt wiping material, preferably an absorbent fabric such as a fiber-based polyester, non-woven textile, or thin cotton cloth or the like. A material having a thickness in the range of approximately 45 um to 140 um has been employed in accordance with the present invention. The web 521 is mounted on the shaft 522 for free rotation. A known manner tensioner 523 and out-of-web sensor 525 are associated with the web. The web 521 material is stretched from the roll across two support shafts, or rollers, 527, 528 to span the pressure pad 509 subjacent the belt 232 outer surface. The web 521 is then captured by a driven, web take-up spool 529. The direction of rotation of the take-up spool, and thus the web material, is indicated by arrow 531. The spool 529 can be driven by a stepper motor to advance the web 521 in predetermined increments so that a fresh segment of web material is properly positioned subjacent the belt 232 for each cleaning cycle. A clearance of between the web 521 and belt 232 outer surface is preferred when the dry cleaner 502 subsystem is disengaged.

Note that the design can be modified to have a single belt inner-surface wiper serving both the wet cleaner 302 and the drying cleaner 502 subsystems. Note also that the dry web and the wet web might be independently incremented to optimize the total service life of the webs and cleaning effectiveness.

In operation during a cleaning cycle, both the wet cleaner 300' and drying cleaner 500 are engaged by the elevating mechanisms 319, 519 with the belt 232 for sequential "washing" and "drying" action as described with respect to the previous embodiments.

In order to prevent presoaked web material from premature evaporation, the solvent should have a low volatility. The printer mechanism and printing cycle should correspondingly provide for small amounts of solvent residue on the belt.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art.

The present invention has been described in an implementation for an ink-jet hard copy apparatus, but this is not intended as a limitation (nor should any be implied) as it is known to use transport belts in many conveyor systems for flexible materials. Moreover, it should be recognized that automated, electromechanical devices can be employed for activating the cleaner mechanisms to wipe the belt.

Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

What is claimed is:

1. Method for cleaning a transport belt, comprising the steps of:

positioning a solvent-bearing cleaning web in non-contacting juxtaposition to a transport surface of the belt;

positioning a dry cleaning web separate and distinct from the solvent-bearing cleaning web downstream of the solvent-bearing cleaning web in non-contacting juxtaposition to the transport surface of the belt; and selectively repositioning both the solvent-bearing cleaning web and the dry cleaning web into contact with the surface.

2. The method as set forth in claim 1, further comprising the step of:

during a cleaning cycle, moving the belt transport surface in a first direction and moving at least one web in contact with the transport surface in an opposite direction.

3. The method as set forth in claim 1, comprising the further step of:

during a cleaning cycle, dispensing a cleaning fluid onto at least one region of the solvent-bearing cleaning web in contact with the transport surface.

4. The method as set forth in claim 3, comprising the further step of:

engaging an opposing surface of the belt with at least one absorbent material wiper contraposed to at least one web in contact with the transport surface.

5. The method as set forth in claim 4, the step of engaging further comprising:

pressing regions of the solvent-bearing cleaning web against the belt such that the solvent passes through perforations in the belt and is received by the wiper.

6. The method as set forth in claim 2, further comprising the step of:

following a cleaning cycle, disengaging each web from the transport surface, and advancing each web such that an unused region of web material is positioned in non-contacting juxtaposition to the transport surface of the belt.

7. The method as set forth in claim 2, comprising the step of:

independently advancing each web bringing fresh sections into contact with the transport surface of the belt.

8. A transport belt cleaning apparatus comprising:

first web means for wet cleaning mounted adjacently an outer surface of a belt;

mounted downstream of the first web means, second web means separate and distinct from the first web means for dry cleaning the outer surface;

means for selectively engaging the first and second web means with the outer surface.

9. The apparatus as set forth in claim 8, the first web means comprising:

a first roll of solvent-bearing web material having a first span region extended and adjacently spaced from a transporting surface of the belt, at least a portion of the first span region carrying a solvent, and a take-up spool attached to the web material upstream of the first span region.

10. The apparatus as set forth in claim 9, the second web means comprising:

a second roll of absorbent web material having a second span region extended and adjacently spaced from a transporting surface of the belt, and a take-up spool attached to the absorbent web material upstream of the second span region.

11. The apparatus as set forth in claim 9, comprising:

means for dispensing cleaning solvent into the first span region.

12. The apparatus as set forth in claim 8, further comprising:

in juxtaposition to the first web means, an absorbent material first wiper mounted adjacently spaced from an inner surface of the belt.

13. The apparatus as set forth in claim 8, the means for selectively engaging further comprising:

associated with each web means, a lift, and mounted in the lift, at least one pressure pad positioned for engaging the respective span region of the associated web means such that the pad exerts a force across one side of the web means span region to cause a contact pressure of an opposing side of the web against the outer surface of the belt.

14. The apparatus as set forth in claim 8, comprising:

each the web is a consumable.

15. The apparatus as set forth in claim 12, comprising:

the first wiper is a consumable piece-part.

16. The apparatus as set forth in claim 8, further comprising:

in juxtaposition to the second web means, an absorbent material second wiper mounted adjacently spaced from an inner surface of the belt.

17. The apparatus as set forth in claim 16, comprising:

the second wiper is a consumable piece-part.

18. The apparatus as set forth in claim 13, comprising:

each the pressure pad is a consumable.

19. The method of claim 1 including moving a first pressure surface located between a first roller and a second roller supporting a first region of the solvent-bearing cleaning web substantially parallel to the transport surface towards the transport surface to move the first region into contact with the first surface.

20. The method of claim 19 including resiliently biasing the solvent-bearing cleaning web against the transport surface.

21. The method of claim 20 including resiliently biasing the dry cleaning web against the transport surface.

22. The method of claim 19 including resiliently biasing a holder movably supporting the first pressure surface with a bias away from the transport surface.

23. The method of claim 22, wherein moving the first pressure surface toward the transport surface includes moving the holder toward the transport surface against the bias.

24. The method of claim 23 including actuating a cam coupled to the holder to move the holder.

25. The method of claim 22 including rotating the cam.

26. The method of claim 1, wherein the first pressure surface is substantially parallel to the transport surface.

27. The method of claim 1, wherein the first pressure surface applies solvent to the web.

28. The method of claim 27, wherein the surface is absorbent.

29. The method of claim 19, wherein the first pressure surface is provided by a pad.

30. The method of claim 1 including resiliently biasing the solvent-bearing cleaning web against the transport surface.

31. The method of claim 19 including resiliently biasing the dry cleaning web against the transport surface.

32. The method of claim 19, wherein the first roller and the second roller remain stationary relative to the transport surface as the first region is moving into contact with the transport surface.

33. The method of claim 19 including resiliently biasing the first pressure surface towards the transport surface.

34. The method of claim 19 including moving a second pressure surface located between a third roller and a fourth roller supporting a second region of the dry cleaning web substantially parallel to the transport surface to move the second region into contact with the transport surface.

35. The method of claim 34 including resiliently biasing the dry cleaning web against the transport surface.

36. The method of claim 35 including resiliently biasing the solvent-bearing cleaning web against the transport surface.

37. The method of claim 34 including resiliently biasing the holder movably supporting the second surface with a bias away from the transport surface.

38. The method of claim 37, wherein moving the second surface towards the transport surface includes moving the holder towards the transport surface.

39. The method of claim 34, wherein the second surface is substantially parallel to the transport surface.

40. The method of claim 34, wherein the second surface is absorbent.

41. A transport belt cleaning apparatus comprising:

a solvent-bearing web movable between a transport belt engaging position and a belt disengaged position, wherein the web is resiliently biased towards the engaging position;

a first roller and a second roller configured to support a region of the web substantially parallel to the transport surface;

a pressure surface between the first roller and the second roller, the pressure surface being movable between a first position in which the pressure surface applies force to the web to maintain the web in the belt engaging position and a second position in which the belt is not maintained in the belt engaging position;

a first bias member resiliently biasing the pressure surface towards the first position;

a holder movably supporting the pressure surface and the first bias member;

wherein the holder is configured to be movable relative to the transport surface; and a second bias member configured to resiliently bias the holder away from the transport surface.

42. The apparatus of claim 41 including an actuator configured to move the holder towards the transport surface against bias from the second bias member.

43. The apparatus of claim 42, wherein the actuator includes a cam operably coupled to the holder.

44. The apparatus of claim 41, wherein the pressure surface applies solvent to the web.

45. The apparatus of claim 44, wherein the pressure surface is absorbent.

46. The apparatus of claim 41, wherein the pressure surface is provided by a pad.

47. The apparatus of claim 41, wherein the first roller and the second roller remain stationary relative to the transport surface as the region is moving into contact with the transport surface.

48. The apparatus of claim 41 including an absorbent wiper configured to be positioned adjacent an inner surface of the belt.

49. The apparatus of claim 41 including a dry cleaning web movable between a transport belt engaging position and a belt disengaged position, wherein the dry cleaning web is resiliently biased towards the engaging position.

* * * * *